United States Patent
Muller et al.

(10) Patent No.: US 12,353,940 B2
(45) Date of Patent: Jul. 8, 2025

(54) TAMPER-EVIDENT RFID TAG AND METHOD THEREOF

(71) Applicant: EM Microelectronic-Marin SA, Marin (CH)

(72) Inventors: Pierre Muller, Marin (CH); Yves Dupraz, Valeyres sous Montagny (CH); Alexis Durand, Cudrefin (CH); Gordon Limond, Payerne (CH)

(73) Assignee: EM MICROELECTRONIC-MARIN S.A., Marin (CH)

( * ) Notice: Subject to any disclaimer, the term of this patent is extended or adjusted under 35 U.S.C. 154(b) by 201 days.

(21) Appl. No.: 18/085,770

(22) Filed: Dec. 21, 2022

(65) Prior Publication Data
US 2023/0206022 A1    Jun. 29, 2023

(30) Foreign Application Priority Data
Dec. 29, 2021    (EP) ..................... 21218213

(51) Int. Cl.
*G06K 19/077* (2006.01)
(52) U.S. Cl.
CPC .............................. *G06K 19/07798* (2013.01)
(58) Field of Classification Search
CPC ....... G06K 19/07798; G06K 19/07381; G06K 19/07743; G06K 19/07754
See application file for complete search history.

(56) References Cited

U.S. PATENT DOCUMENTS

| 2006/0092028 | A1 | 5/2006 | Lerch et al. |
| 2009/0047797 | A1* | 2/2009 | Anderson ............. H01L 23/573 |
| | | | 257/E21.24 |
| 2011/0169611 | A1 | 7/2011 | Hood et al. |
| 2014/0239074 | A1 | 8/2014 | Wang |
| 2014/0326790 | A1 | 11/2014 | Xu et al. |
| 2020/0279143 | A1 | 9/2020 | Kaczmarz et al. |

FOREIGN PATENT DOCUMENTS

| CN | 206 946 532 U | 1/2018 | |
| CN | 108 596 323 A | 9/2018 | |
| EP | 0940652 A2 * | 9/1999 | ............... G01B 7/00 |
| FR | 2 890 213 A1 | 3/2007 | |

OTHER PUBLICATIONS

European Search Report for EP 21 21 8213, dated Jun. 23, 2022.

* cited by examiner

*Primary Examiner* — Quan Zhen Wang
*Assistant Examiner* — Rajsheed O Black-Childress
(74) *Attorney, Agent, or Firm* — Sughrue Mion, PLLC (57) ABSTRACT

A tamper-evident RFID Tag (100) and a method for manufacturing it. The method (500) may provide (510) at least one protection layer (151) before being cured (520) such as to turn the at least one protection layer (151) into at least one degradable layer (155), and to prevent an assembly or a reassembly of the tamper-evident RFID Tag (100) after any attempt of harvesting of the tamper-evident RFID Tag (100).

13 Claims, 6 Drawing Sheets

TAMPER-EVIDENT RFID TAG AND METHOD THEREOF

CROSS REFERENCE TO RELATED APPLICATIONS

This application claims priority to European Patent Application No. 21218213.3 filed Dec. 29, 2021, the entire contents of which are incorporated herein by reference.

TECHNICAL FIELD

The invention relates to the field of tamper-evident devices. More specifically, the present invention relates to tamper-evident RFID Tag for container closure plugs.

STATE OF THE ART

Radio frequency identification, RFID for short, technology has been widely using in logistics, retail industries and many other areas. It has improved management efficiency and saved labor costs significantly. A RFID system may comprises a RFID tag and a RFID reader. The work process is that the RFID reader generates electromagnetic wave at a particular frequency and sent request signals. When a RFID tag passes through within the RFID readers scanning distance, it will detect the request signal and reverse scattering couple the electromagnetic wave back to the RFID reader.

RFID technology has great potential in applications in anti-counterfeiting field. In industries such as liquor, tobacco and pharmacy, once counterfeit products emerge, they always bring an immeasurable loss to both the society and individuals. Safe and effective anti-counterfeiting measurements are need in product production and distribution fields in these industries. Paper-based print anti-counterfeiting technologies, laser mark and digital security code for instance, are not unique or exclusive. They are easy to be duplicated. It is difficult for them to play the role of real anti-counterfeiting. RFID anti-counterfeiting technology becomes superior in the industries mentioned above by its outstanding anti-counterfeiting capabilities. RFID anti-counterfeiting technology requires each passive RFID tag to be allocated to every protected subject. Each RFID tag has a globally unique ID number. And the ID number is stored in the read-only memory of a chip so that they cannot be modified or copied. This greatly enhanced the anti-counterfeiting performance.

However, thanks to some technics, it is possible to remove and to harvest the RFID tag from the original product and to use it on a counterfeit product, which makes really difficult for the customer to make the difference between an original product and a counterfeit product.

SUMMARY OF THE INVENTION

The present invention aims to overcome these drawbacks, and therefore has for its object to provides a method for manufacturing a Tamper-evident RFID Tag; said method comprising at least one:
Providing of at least one protection layer; said at least one protection layer being deposited on at least one integrated circuit;
Curing said at least one protection layer between 100° C. and 200° C., preferably between 130° C. and 170° C., during 2 minutes up to 45 minutes, preferably between 5 minutes and 15 minutes, such as to turn said at least one protection layer into at least one degradable layer.

Thanks to the arrangements according to the invention, any attempt of harvesting prevents an assembly or a reassembly of said Tamper-evident RFID Tag.

According to an embodiment, said method comprises at least one main electrical contact deposit; said at least one main electrical contact deposit comprises at least one:
first main electrical contact deposit; said at least one first main electrical contact deposit comprises a deposit of at least one first electrical contact and/or at least one second electrical contact on said at least one integrated circuit and/or on said at least one degradable layer; and/or
second main electrical contact deposit; said at least one second main electrical contact deposit comprises a deposit of at least one first electrical contact and/or at least one secondary electrical contact on said at least one integrated circuit and/or on said at least one degradable layer.

Thanks to the arrangements according to the invention, any attempt of harvesting prevents an assembly or a reassembly of said Tamper-evident RFID Tag, in particular with an antenna. Indeed, said at least one first electrical contact and/or said at least one secondary electrical contact realizes or realize a short circuit with said at least one secondary IC contact and/or with said at least one primary IC contact respectively.

According to an embodiment, said method comprises at least one protection layer deposit; said at least one protection layer deposit comprises a deposit of said at least one protection layer on said at least one integrated circuit.

According to an embodiment, said method comprises at least one auxiliary electrical contact deposit; said at least one auxiliary electrical contact deposit comprises at least one:
first auxiliary electrical contact deposit; said at least one first auxiliary electrical contact deposit comprises a deposit of at least one primary electrical contact and/or at least one secondary electrical contact on said at least one integrated circuit and/or on said at least one degradable layer; and/or
second auxiliary electrical contact deposit; said at least one second auxiliary electrical contact deposit comprises a deposit of at least one primary electrical contact and/or at least one primary electrical contact on said at least one integrated circuit and/or on said at least one degradable layer.

Thanks to the arrangements according to the invention, said at least one primary electrical contact and/or said at least one secondary electrical contact allows or allow the electrical contact between the antenna and said at least one primary IC contact and/or said at least one secondary IC contact.

According to an embodiment, said at least one first main electrical contact deposit occurs after said at least one protection layer deposit and/or said at least one second main electrical contact deposit.

Thanks to the arrangements according to the invention, any attempt of harvesting prevents an assembly or a reassembly of said Tamper-evident RFID Tag, in particular with an antenna.

According to an embodiment, said at least one second main electrical contact deposit occurs after said at least one protection layer deposit and/or said at least one first main electrical contact deposit.

Thanks to the arrangements according to the invention, any attempt of harvesting prevents an assembly or a reassembly of said Tamper-evident RFID Tag, in particular with an antenna.

According to an embodiment, said at least one first auxiliary electrical contact deposit occurs after said at least one protection layer deposit and/or said at least one second auxiliary electrical contact deposit.

Thanks to the arrangements according to the invention, said at least one primary electrical contact and/or said at least one secondary electrical contact allows or allow the electrical contact between the antenna and said at least one primary IC contact and/or said at least one secondary IC contact.

According to an embodiment, said at least one second auxiliary electrical contact deposit occurs after said at least one protection layer deposit and/or said at least one first auxiliary electrical contact deposit.

Thanks to the arrangements according to the invention, when said Tamper-evident RFID Tag is manipulated, said at least one degradable layer is altered and said at least one integrated circuit is inoperable.

The present invention aims to overcome these drawbacks, and therefore has for its object to provides a tamper-evident RFID Tag comprising at least one integrated circuit, at least one primary IC contact:
  at least one first electrical contact: said at least one first electrical contact comprising at least one first proximal electrical contact portion configured to contact said at least one primary IC contact and at least one first distal electrical contact portion configured to be near said at least one secondary IC contact; and/or,
  at least one second electrical contact: said at least one second electrical contact comprising at least one second proximal electrical contact portion configured to contact said at least one secondary IC contact and at least one second distal electrical contact portion configured to be near said at least one primary IC contact.

Thanks to the arrangements according to the invention, any attempt of harvesting prevents an assembly or a reassembly of said Tamper-evident RFID Tag.

According to an embodiment, said tamper-evident RFID Tag comprises at least one degradable layer configured to cover said at least one first distal electrical contact portion and/or said at least one second distal electrical contact portion.

Thanks to the arrangements according to the invention, any attempt of harvesting prevents an assembly or a reassembly of said Tamper-evident RFID Tag by altering said at least one degradable layer and thus preventing an assembly or a reassembly of said Tamper-evident RFID Tag with an antenna due to a potential short circuit said at least one first distal electrical contact portion and said at least one secondary IC contact and/or said at least one second distal electrical contact portion and said at least one primary IC contact.

According to an embodiment, said at least one degradable layer is configured to be comprised between said at least one first distal electrical contact portion and said at least one second proximal electrical contact portion and/or said at least one secondary IC contact, and/or to be comprised between said at least one second distal electrical contact portion and said at least one first proximal electrical contact portion and/or said at least one primary IC contact.

Thanks to the arrangements according to the invention, any attempt of harvesting prevents an assembly or a reassembly of said Tamper-evident RFID Tag by altering said at least one degradable layer and thus preventing an assembly or a reassembly of said Tamper-evident RFID Tag with an antenna due to a potential short circuit said at least one first distal electrical contact portion and said at least one secondary IC contact and/or said at least one second distal electrical contact portion and said at least one primary IC contact.

According to an embodiment, said at least one first distal electrical contact portion is configured to be disposed above said at least one second proximal electrical contact portion and/or said at least one secondary IC contact, and/or said at least one second distal electrical contact portion is configured to be disposed above said at least one first proximal electrical contact portion and/or said at least one primary IC contact.

Thanks to the arrangements according to the invention, any attempt of harvesting prevents an assembly or a reassembly of said Tamper-evident RFID Tag by altering said at least one degradable layer and thus preventing an assembly or a reassembly of said Tamper-evident RFID Tag with an antenna due to a potential short circuit said at least one first distal electrical contact portion and said at least one secondary IC contact and/or said at least one second distal electrical contact portion and said at least one primary IC contact.

According to an embodiment, said tamper-evident RFID Tag comprises at least one primary electrical contact configured to contact said at least one primary IC contact and/or said at least one first electrical contact, and/or at least one secondary electrical contact configured to contact said at least one secondary IC contact and/or said at least one second electrical contact.

Thanks to the arrangements according to the invention, any attempt of harvesting prevents an assembly or a reassembly of said Tamper-evident RFID Tag by altering said at least one degradable layer and thus preventing an assembly or a reassembly of said Tamper-evident RFID Tag with an antenna.

According to an embodiment, said at least one primary electrical contact and/or said at least one secondary electrical contact comprises or comprise at least one undercut such as to be disconnected of said at least one primary IC contact and/or said at least one secondary IC contact respectively when said at least one degradable layer is altered and/or removed.

Thanks to the arrangements according to the invention, any attempt of harvesting prevents an assembly or a reassembly of said Tamper-evident RFID Tag by altering said at least one degradable layer and thus preventing an assembly or a reassembly of said Tamper-evident RFID Tag with an antenna.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which.

DESCRIPTION OF THE INVENTION

The present invention aims to overcome the drawbacks of the prior art via a Tamper-evident RFID Tag 100, which may guaranty the origin of the product and may prevent any attempt of harvesting an assembly or a reassembly of said Tamper-evident RFID Tag 100. The latter, i.e. said tamper-evident RFID Tag 100 may comprise at least one integrated circuit 101, an insulating layer 102, at least one primary IC contact 110, and at least one secondary IC contact 120 as illustrated in FIG. 5 for instance.

Said method 500 may comprises at least one main electrical contact deposit 530 comprising at least one first main electrical contact deposit 531. Said at least one first main electrical contact deposit 531 may deposit at least one first electrical contact 130 and/or at least one second electrical contact 140 on said at least one integrated circuit 101.

Figure 5:
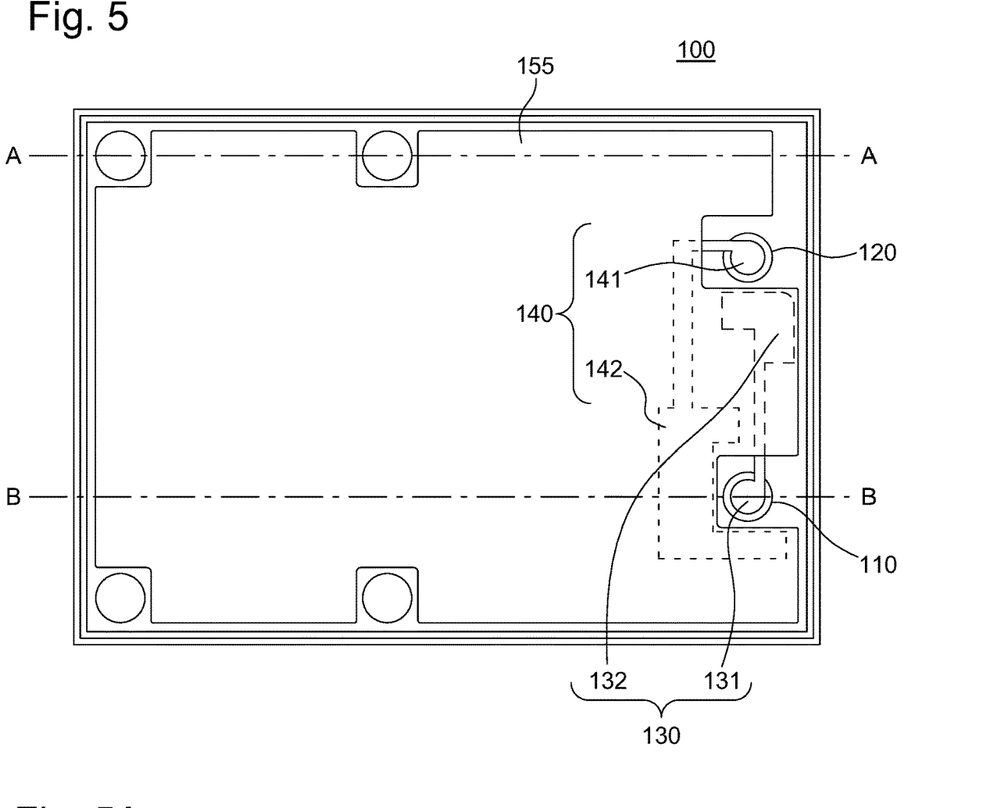
FIGS. 5, 5A & 5B represent an upper view and two sectional view of a tamper-evident RFID Tag 100 according to another embodiment; and, FIG. 6 illustrates a method for manufacturing 500 said Tamper-evident RFID Tag 100.
Figure 5A:
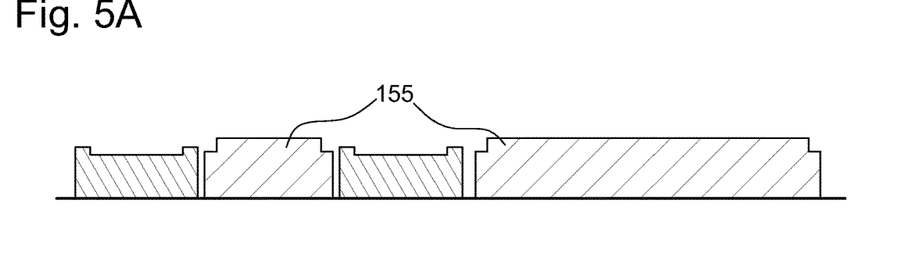
Figure 5B:
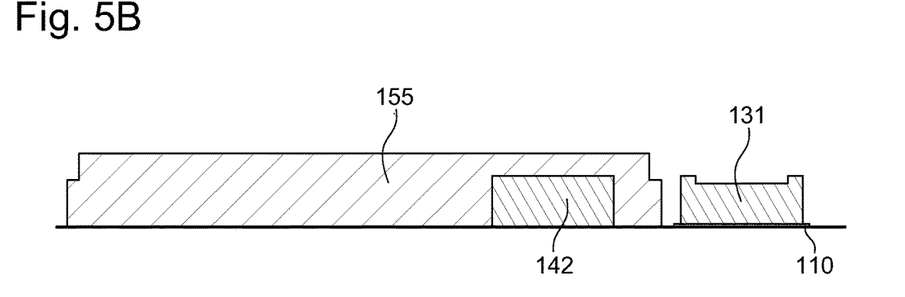

As it can be construed from FIG. 5, said at least one first electrical contact 130 may comprise at least one first proximal electrical contact portion 131 configured to contact said at least one primary IC contact 110 and at least one first distal electrical contact portion 132 configured to be near said at least one secondary IC contact 120. Respectively, in FIG. 5, said at least one second electrical contact 140 may comprise at least one second proximal electrical contact portion 141 configured to contact said at least one secondary IC contact 120 and at least one second distal electrical contact portion 142 configured to be near said at least one primary IC contact 110. FIG. 5A may present a sectional view of a tamper-evident RFID Tag 100 showing how partly said at least one degradable layer 155 may cover said tamper-evident RFID Tag 100 and uncover some test pad. FIG. 5B may illustrate how partly said at least one degradable layer 155 may cover said tamper-evident RFID Tag 100, said at least one first electrical contact 130 and said at least one secondary electrical contact 140. Indeed, said at least one first distal electrical contact portion 132 and said at least one second distal electrical contact portion 142 may be covered whereas said at least one second proximal electrical contact portion 141 and said at least one first proximal electrical contact portion 131 may be not.

However, in some embodiments, there may only be said at least one first electrical contact 130 or said at least one second electrical contact 140.

Figure 6:
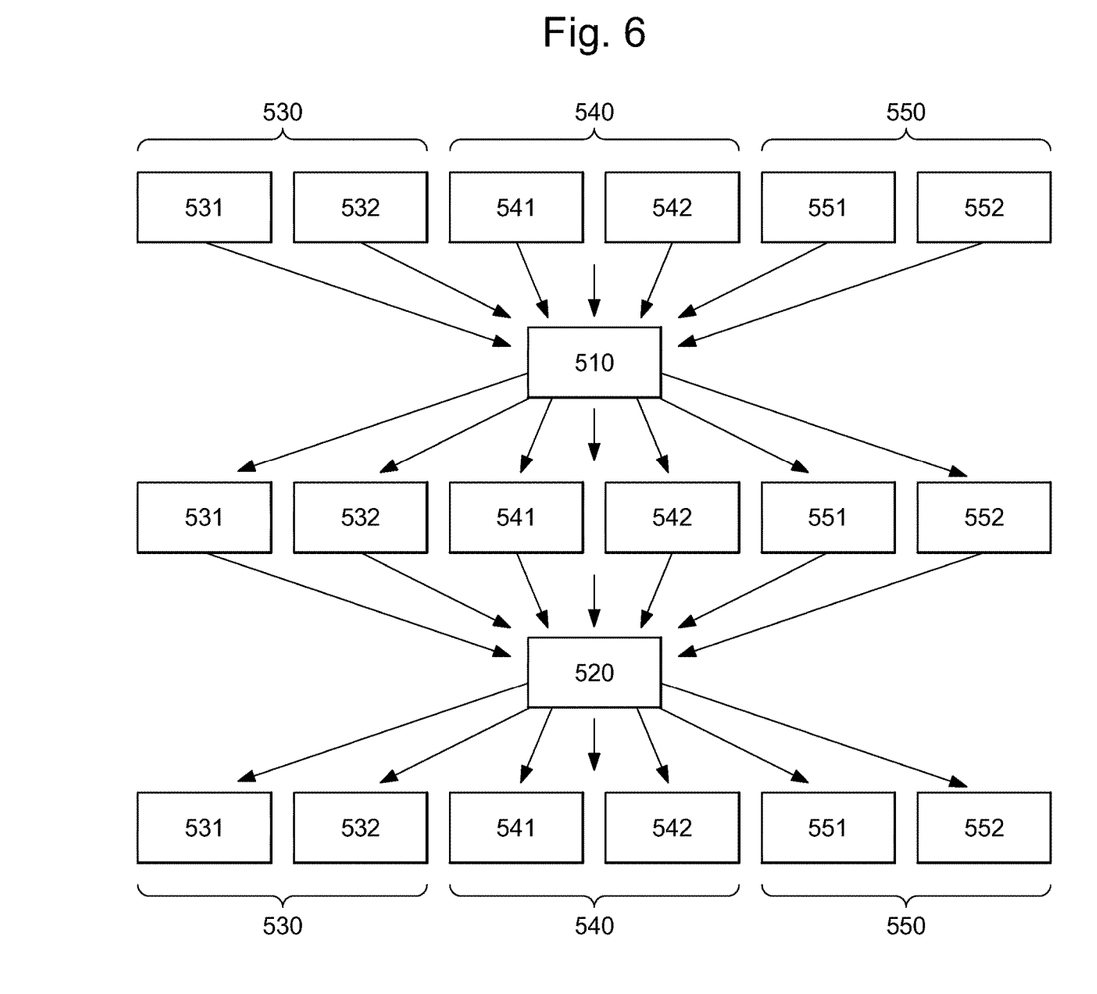

As depicted in FIG. 6, said method 500 may comprise at least one protection layer deposit 540 of at least one protection layer 151 partly or totally on said at least one integrated circuit 101, and according to the embodiments, and on said at least one first electrical contact 130 and/or said at least one second electrical contact 140. Indeed, said at least one protection layer 151 may cover said at least one first distal electrical contact portion 132 and/or said at least one second distal electrical contact portion 142.

Further, at least one protection layer 151 may be provided 510 and may be deposited on said at least one integrated circuit 101, on said at least one first electrical contact 130 and/or on said at least one second electrical contact 140. After said at least one providing 510 of said at least one protection layer 151, at least one curing 520 of said at least one protection layer 151 between 100° C. and 200° C., preferably between 130° C. and 170° C., during 2 minutes up to 45 minutes, preferably between 5 minutes and 15 minutes, may occur such as to turn said at least one protection layer 151 into at least one degradable layer 155.

Said at least one main electrical contact deposit 530 may also comprise at least one second main electrical contact deposit 532 of said at least one first electrical contact 130 and/or of said at least one secondary electrical contact 140, if said at least one first electrical contact 130 and/or of said at least one secondary electrical contact 140 is or are not deposit during said at least one first main electrical contact deposit 531, on said at least one integrated circuit 101 and/or on said at least one degradable layer 155.

Further, since said at least one protection layer 151 may be deposited in an early phase of method 500, said at least one protection layer 151 may be comprised between said at least one first distal electrical contact portion 132 and said at least one second proximal electrical contact portion 141 and/or said at least one secondary IC contact 120, and/or to be comprised between said at least one second distal electrical contact portion 142 and said at least one first proximal electrical contact portion 131 and/or said at least one primary IC contact 110.

The same may be possible after said at least one protection layer 151 turns into said at least one degradable layer 155, which means said at least one degradable layer 155 may be comprised between said at least one first distal electrical contact portion 132 and said at least one second proximal electrical contact portion 141 and/or said at least one secondary IC contact 120, and/or to be comprised between said at least one second distal electrical contact portion 142 and said at least one first proximal electrical contact portion 131 and/or said at least one primary IC contact 110. Therefore, said at least one first distal electrical contact portion 132 may be disposed above said at least one second proximal electrical contact portion 141 and/or said at least one secondary IC contact 120 in some cases, and/or said at least one second distal electrical contact portion 142 is configured to be disposed above said at least one first proximal electrical contact portion 131 and/or said at least one primary IC contact 110 in some another cases.

As aforementioned in some the embodiments, there may be said at least one first electrical contact 130 and/or said at least one second electrical contact 140, and said method 500 may comprise at least one auxiliary electrical contact deposit 550 comprising at least one first auxiliary electrical contact deposit 551 and/or at least one second auxiliary electrical contact deposit 552.

Said at least one first auxiliary electrical contact deposit 551 may comprise a deposit of at least one primary electrical contact 115 and/or at least one secondary electrical contact 125 on said at least one integrated circuit 101 and/or on said at least one degradable layer 155. Depending on the embodiments, said at least one second auxiliary electrical contact deposit 552 may comprise a deposit of at least one primary electrical contact 115 and/or at least one primary electrical contact 125 on said at least one integrated circuit 101 and/or on said at least one degradable layer 155. In both case, said at least one primary electrical contact 115 and/or said at least one secondary electrical contact 125 may allow the electrical contact between the antenna and said at least one primary IC contact 110 and/or said at least one secondary IC contact 120. Indeed, said at least one primary electrical contact 115 may contact said at least one primary IC contact 110 and/or said at least one first electrical contact 130, and/or said at least one secondary electrical contact 125 may contact said at least one secondary IC contact 120 and/or said at least one second electrical contact 140.

As illustrated in FIG. 2, said at least one primary electrical contact 115 and/or said at least one secondary electrical contact 125 may comprise at least one undercut such as to be disconnected of said at least one primary IC contact 110 and/or said at least one secondary IC contact 120 respectively when said at least one degradable layer 155 is altered and/or removed.

As it appears clearly from the present specification, any attempt of harvesting prevents an assembly or a reassembly of said Tamper-evident RFID Tag 100, in particular with an antenna. Indeed, said at least one first electrical contact 130 and/or said at least one secondary electrical contact 140 may realize a short circuit with said at least one secondary IC contact 120 and/or with said at least one primary IC contact 110 respectively. Indeed, if someone try to harvest said Tamper-evident RFID Tag 100, said antenna may be separate from said at least one integrated circuit 101 and said at least one degradable layer 155 may be deteriorated, which leads to an exposure of said at least one first distal electrical contact portion 132 and said at least one secondary IC contact 120 or at least one second proximal electrical contact portion 141 and/or of said at least one second distal electrical contact portion 142 and said at least one primary IC contact 110 or said at least one first proximal electrical contact portion 131.

If an assembly or a reassembly is attempted, a short circuit occurs due to the vicinity of said at least one distal electrical contact portion 132, 142 and said at least one IC contact 110, 120 or at least one proximal electrical contact portion 131, 141, and this leads to a dysfunction of said at least one integrated circuit 101.

Figure 1A:
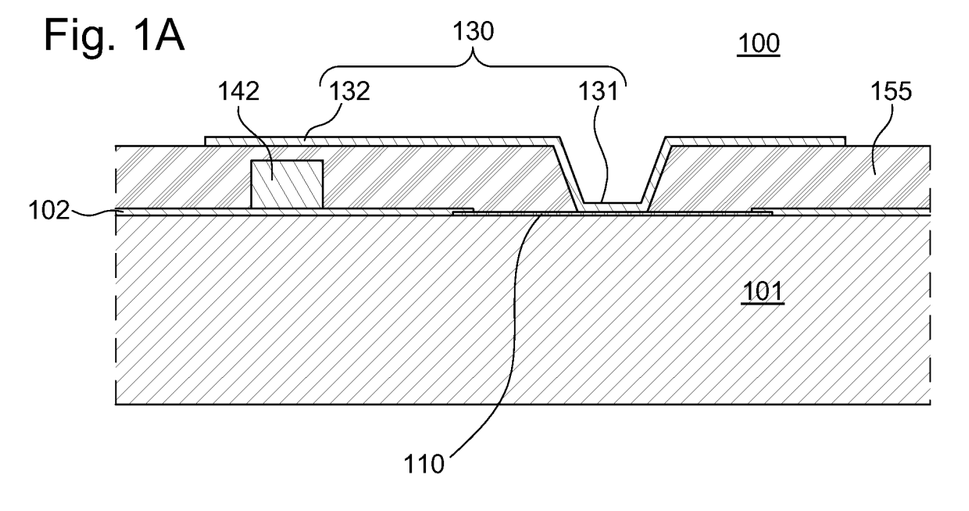
FIGS. 1A and 1B represent a sectional view of a tamper-evident RFID Tag 100 according to a first embodiment.
Figure 1B:
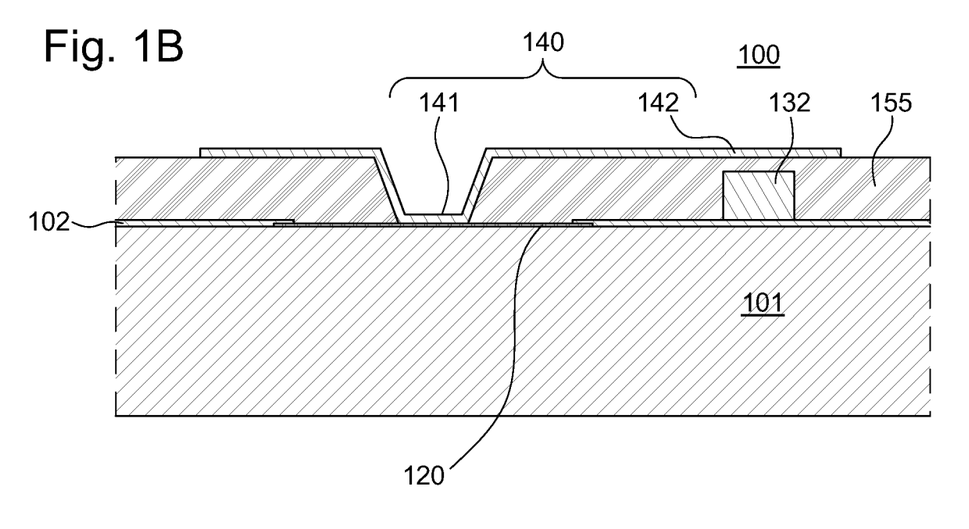

FIGS. 1A and 1B illustrate a first embodiment, wherein said at least one first electrical contact 130 and at least one second electrical contact 140 may be disposed on said at least one integrated circuit 101. In this embodiment, said at least one first main electrical contact deposit 531 may deposit said at least one second electrical contact 140 contacting said at least one secondary IC contact 120, more precisely, said at least one second proximal electrical contact portion 141 may contact said at least one secondary IC contact 120 and said at least one second distal electrical contact portion 142 may be near said at least one primary IC contact 110.

Then, said at least one protection layer 151 may be deposited partly or totally on said at least one integrated circuit 101, on said at least one secondary IC contact 120, on said at least one second proximal electrical contact portion 141 and on said at least one second distal electrical contact portion 142.

Said at least one protection layer 151 may be cured 520 between 100° C. and 200° C., preferably between 130° C. and 170° C., during 2 minutes up to 45 minutes, preferably between 5 minutes and 15 minutes, and may turn into at least one degradable layer 155.

After that, said at least one first proximal electrical contact portion 131 may be deposited on and may contact said at least one primary IC contact 110 and said at least one first distal electrical contact portion 132 may be deposited on said at least one degradable layer 155 and may be above said at least one second distal electrical contact portion 142, and thus said at least one first distal electrical contact portion 132 may be near said at least one secondary IC contact 120.

In case, said Tamper-evident RFID Tag 100 is mashed, said at least one second distal electrical contact portion 142, and thus said at least one first distal electrical contact portion 132 may create a short circuit between said at least one primary IC contact 110 and said at least one secondary IC contact 120, and if said Tamper-evident RFID Tag 100 is peeled or harvested, said at least one degradable layer 155 may be altered or removed with said at least one first electrical contact 130, and said at least one secondary electrical contact 140 and said at least one primary IC contact 110 may be revealed, and said at least one integrated circuit 101 may be inoperable. Since said at least one second distal electrical contact portion 142 may be near or too close to said at least one primary IC contact 110, an assembly or a reassembly of said Tamper-evident RFID Tag 100 may be prevented and an antenna may be not soldered on said at least one integrated circuit 101 without short circuited said at least one primary IC contact 110 and said at least one secondary IC contact 120 via said at least one second distal electrical contact portion 142.

Figure 2A:
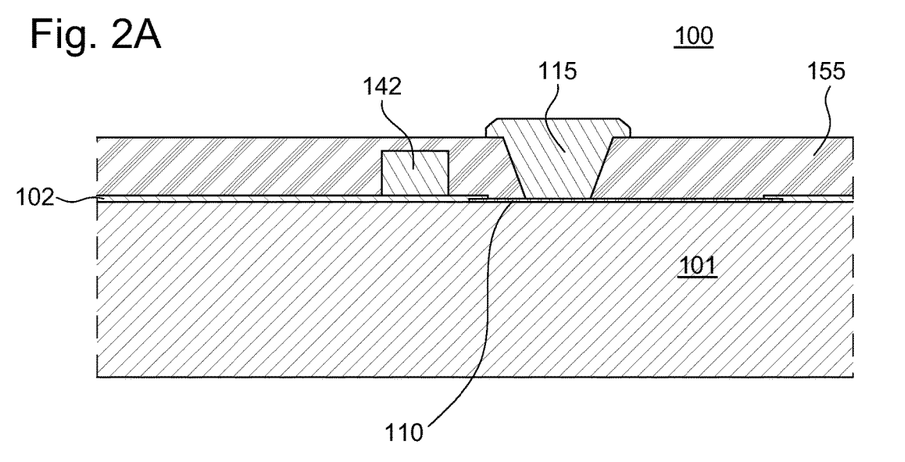
FIGS. 2A and 2B illustrate a sectional view of a tamper-evident RFID Tag 100 according to a second embodiment.
Figure 2B:
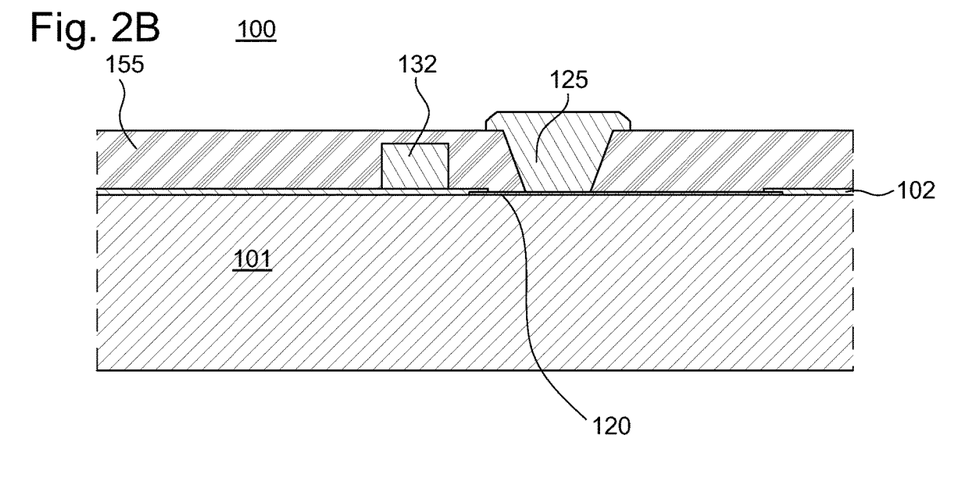

In FIGS. 2A and 2B, said method for manufacturing 500 said Tamper-evident RFID Tag 100 may be slightly different. Indeed, said at least one second electrical contact 140 may be applied on said at least one secondary IC contact 120: said at least one second proximal electrical contact portion 141 may contact said at least one secondary IC contact 120 and said at least one second distal electrical contact portion 142 may be near said at least one primary IC contact 110. Said at least one protection layer 151 may be deposited totally or partly on said at least one integrated circuit 101, before said at least one curing 520.

Then, said at least one first auxiliary electrical contact deposit 551 may take place. Said at least one primary electrical contact 115 may be deposited on said at least one integrated circuit 101 and on said at least one degradable layer 155. Indeed, said at least one primary electrical contact 115 may have said at least one undercut such as to be disconnected of said at least one primary IC contact 110 when said at least one degradable layer 155 is altered and/or removed. Thus, said at least one primary IC contact 110 and said at least one second distal electrical contact portion 142 may be uncovered such as to prevent an assembly or a reassembly of said Tamper-evident RFID Tag 100 by short circuiting said at least one primary IC contact 110 and said at least one second distal electrical contact portion 142 and avoiding the soldering of an new antenna and rending said at least one integrated circuit 101 inoperable for example. Indeed, any attempt of harvesting prevents an assembly or a reassembly of said Tamper-evident RFID Tag 100 by altering said at least one degradable layer 155 may prevent an assembly or a reassembly of said Tamper-evident RFID Tag 100 with an antenna due to a potential short circuit between said at least one first distal electrical contact portion 132 and said at least one secondary IC contact 120 and/or said at least one second distal electrical contact portion 142 and said at least one primary IC contact 110.

Figure 3A:
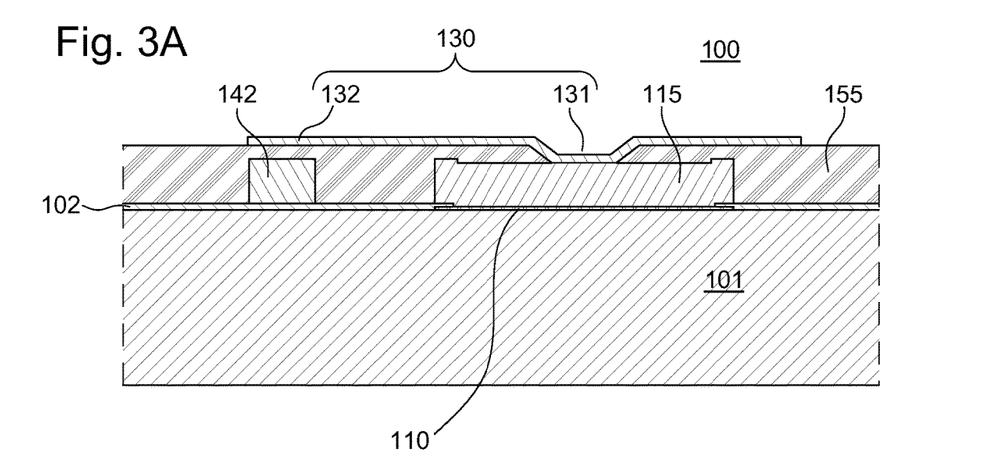
FIGS. 3A and 3B depict a sectional view of a tamper-evident RFID Tag 100 according to a third embodiment.
Figure 3B:
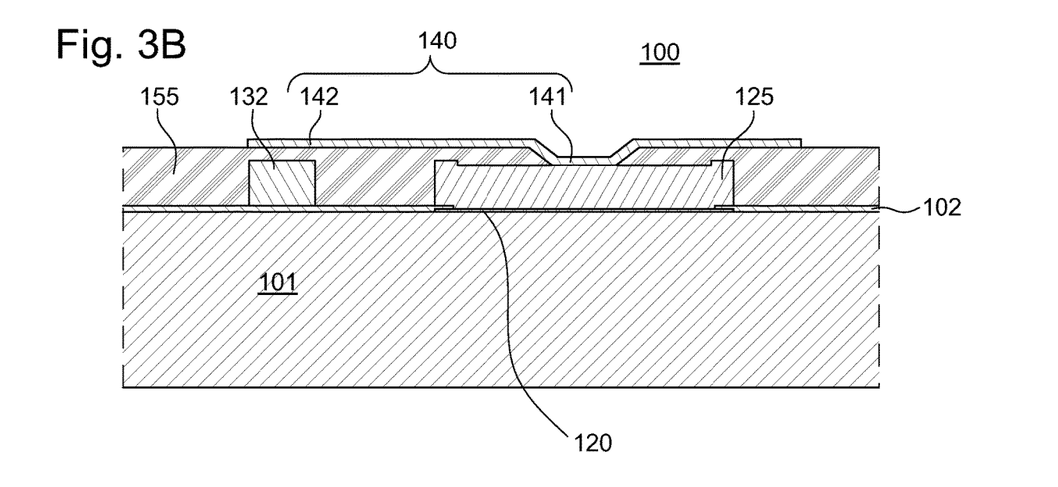

Said tamper-evident RFID Tag 100 of the third embodiment in FIGS. 3A and 3B may be manufactured differently. Indeed, said at least one primary electrical contact 115 and said at least one second electrical contact 140, rather said at least one second proximal electrical contact portion 141 and said at least one second distal electrical contact portion 142 may be deposited on said at least one integrated circuit 101. Said at least one protection layer 151 may be deposited partly or totally on said at least one integrated circuit 101, said at least one primary electrical contact 115 and said at least one second electrical contact 140 and cured 520 such as to turn said at least one protection layer 151 into said at least one degradable layer 155. In this third embodiment, said at least one second main electrical contact deposit 532 may occurs and said at least one first electrical contact 130 may be deposited on said at least one degradable layer 155 as depicted in FIG. 3. Said at least one first electrical contact 130 may contact said at least one primary IC contact 110 via said at least one primary electrical contact 115 and said at least one first proximal electrical contact portion 131. Said at least one first distal electrical contact portion 132 may be near said at least one secondary IC contact 120 and above said at least one second distal electrical contact portion 142. In this case, said at least one first distal electrical contact portion 132 may be closer to said at least one secondary IC contact 120 by being above said at least one second distal electrical contact portion 142 then said at least one first proximal electrical contact portion 131, said Tamper-evident RFID Tag 100 is mashed, said at least one second distal electrical contact portion 142, and thus said at least one first distal electrical contact portion 132 may create a short circuit between said at least one primary IC contact 110 and said at least one secondary IC contact 120, and If said tamper-evident RFID Tag 100 is peeled or if there is an attempt to peel said tamper-evident RFID Tag 100, said at least one degradable layer 155 may be degraded or removed taking away said at least one first electrical contact 130 and/or said at least one primary electrical contact 115 and thus said at least one primary IC contact 110 and said at least one second distal electrical contact portion 142 may be uncovered such as to prevent an assembly or a reassembly of said Tamper-evident RFID Tag 100 by short circuiting said at least one primary IC contact 110 and said at least one second distal electrical contact portion 142 and avoiding the soldering of an new antenna for example.

Figure 4A:
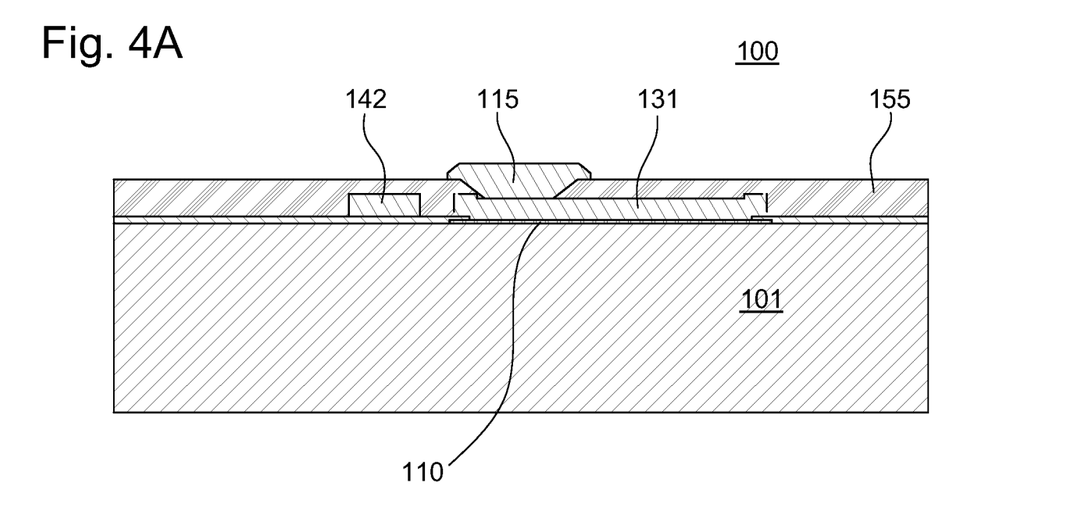
FIGS. 4A and 4B show a sectional view of a tamper-evident RFID Tag 100 according to a fourth embodiment.
Figure 4B:
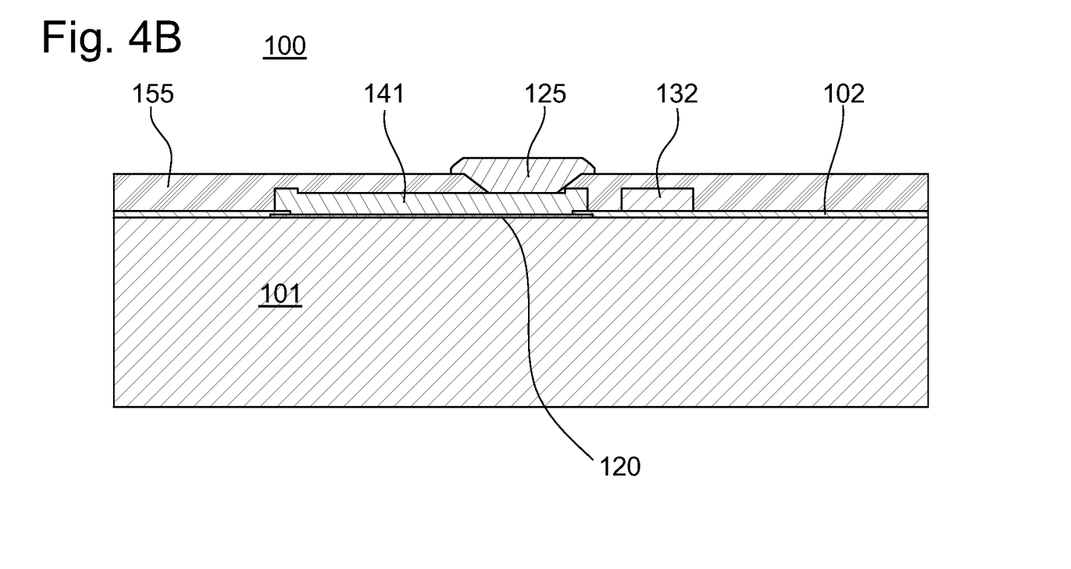

FIGS. 4A and 4B illustrate a fourth embodiment, wherein said at least one first main electrical contact deposit 531 may occurs and may deposit said at least one first electrical contact 130 and said at least one second electrical contact 140 on said at least one integrated circuit 101. After said at least one providing 510 of said at least one protection layer 151 and said at least one curing 520, such as to turn said at least one protection layer 151 into at least one degradable layer 155, said at least one second auxiliary electrical contact deposit 552 may deposit said at least one primary electrical contact 115 on said at least one first electrical contact 130 and on said at least one degradable layer 155. As it may be observed in FIG. 4, said at least one primary electrical contact 115 may comprise said at least one undercut such as to take away said at least one first electrical contact 130 when said at least one degradable layer 155 is altered and/or removed during the peeling of said tamper-evident RFID Tag 100. Thus said at least one primary IC contact 110 and said at least one second distal electrical contact portion 142 may be uncovered such as to prevent an assembly or a reassembly of said Tamper-evident RFID Tag 100 by short circuiting said at least one primary IC contact 110 and said at least one second distal electrical contact portion 142 and avoiding the soldering of an new antenna for example.

The invention claimed is:

1. A method for manufacturing a tamper-evident RFID Tag, said method comprising:
providing a protection layer deposited on an integrated circuit that has a primary IC contact and a secondary IC contact;
curing said protection layer between 100° C. and 200° C. for between 2 minutes and 45 minutes such as to turn said protection layer into a degradable layer; and
providing a main electrical contact deposit comprising:
depositing a first electrical contact on said degradable layer, and
depositing a second electrical contact on said degradable layer,
wherein said first electrical contact comprises a first proximal electrical contact portion and a first distal electrical contact portion, and said second electrical contact comprises a second proximal electrical contact portion and a second distal electrical contact portion
wherein said depositing the first electrical contact on said degradable layer comprises:
configuring the first proximal contact portion to contact said primary IC contact, and
configuring said first distal electrical contact portion to be a predetermined
distance from said secondary IC contact, and wherein said depositing the second electrical contact on said degradable layer comprises:
configuring the second proximal contact portion to contact said secondary IC contact, and
configuring said second distal electrical contact portion to be a predetermined distance from said primary IC contact.

2. The method according to claim 1, further comprising providing a protection layer deposit by depositing said protection layer on said integrated circuit.

3. The method according to claim 2, further comprising providing an auxiliary electrical contact deposit; said auxiliary electrical contact deposit comprises:
a first auxiliary electrical contact formed by depositing a primary electrical contact and a secondary electrical contact on said integrated circuit or on said degradable layer; and
a second auxiliary electrical contact deposit formed by depositing a primary electrical contact and a primary electrical contact on said integrated circuit or on said degradable layer.

4. The method according to claim 3, wherein said first auxiliary electrical contact deposit occurs after said protection layer deposit and said second auxiliary electrical contact deposit.

5. The method according to claim 3, wherein said second auxiliary electrical contact deposit occurs after said protection layer deposit and said first auxiliary electrical contact deposit.

6. The method according to claim 2, wherein said depositing the first electrical contact occurs after said protection layer deposit and said depositing the second electrical contact.

7. The method according to claim 2, wherein said depositing the second electrical contact occurs after said protection layer deposit and said depositing the first electrical contact deposit.

8. A tamper-evident RFID Tag comprising an integrated circuit comprising a degradable layer, a primary IC contact and a secondary IC contact provided on said integrated circuit, and:
a first electrical contact provided on said degradable layer: said first electrical contact comprising:
a first proximal electrical contact portion configured to contact said primary IC contact, and
a first distal electrical contact portion configured to be a predetermined distance from said secondary IC contact; and
a second electrical contact provided on said degradable layer: said second electrical contact comprising:
a second proximal electrical contact portion configured to contact said secondary IC contact, and
a second distal electrical contact portion configured to be a predetermined distance from said primary IC contact.

9. The tamper-evident RFID Tag according to claim 8, which comprises said degradable layer configured to cover said first distal electrical contact portion and said second distal electrical contact portion.

10. The tamper-evident RFID Tag according to claim 8, wherein said degradable layer is configured to be comprised between said first distal electrical contact portion and said second proximal electrical contact portion and said secondary IC contact, and to be comprised between said second distal electrical contact portion and said first proximal electrical contact portion and said primary IC contact.

11. The tamper-evident RFID Tag according to claim 8, wherein said first distal electrical contact portion is configured to be disposed above said second proximal electrical contact portion and said secondary IC contact, and said second distal electrical contact portion is configured to be disposed above said first proximal electrical contact portion and said primary IC contact.

12. The tamper-evident RFID Tag according to claim 8, which comprises a primary electrical contact configured to contact said primary IC contact and said first electrical contact, and a secondary electrical contact configured to contact said secondary IC contact and said second electrical contact.

13. The tamper-evident RFID Tag according to claim 12, wherein said primary electrical contact and said secondary electrical contact comprises or comprise an undercut such as to be disconnected of said primary IC contact and said secondary IC contact respectively when said degradable layer is altered or removed.

* * * * *